COMBINED MAGNIFIER LENS AND NOTE-PAD MOUNT

Filed May 18, 1962 2 Sheets-Sheet 1

INVENTORS
FRED B. PFEIFFER
JESSE R. CROSSAN
BY

ATTY.

Oct. 19, 1965 J. R. CROSSAN ETAL 3,212,794

COMBINED MAGNIFIER LENS AND NOTE-PAD MOUNT

Filed May 18, 1962 2 Sheets-Sheet 2

INVENTORS
FRED B. PFEIFFER
BY JESSE R. CROSSAN

ATTY.

United States Patent Office 3,212,794

Patented Oct. 19, 1965

3,212,794

COMBINED MAGNIFIER LENS AND NOTE-PAD MOUNT

Jesse R. Crossan, 345 Highland Ave., Wadsworth, Ohio, and Fred B. Pfeiffer, 270 Ferndale Ave., Akron, Ohio Filed May 18, 1962, Ser. No. 195,850

3 Claims. (Cl. 281—15)

This invention relates to a note-pad mount which includes magnifying means as an integral part thereof. It is particularly useful in locating the name of a party to be called in a telephone directory and in magnifying the printed name and numbers and in segregating same immediately adjacent a note-pad whereby the user can conveniently record the information by writing, of a size to accommodate the user's vision, and for reference to the writing during dialing.

City telephone directories present a problem to their users in that such directories are large cumbersome and frequently distorted from use. The print is very small and extremely difficult for those will slightly impaired vision to read. Those with no impairment of vision often find it difficult to follow the alignment of the names and the numbers. The problem is further aggravated by the need of most users to repeatedly refer to the directory while dialing due to the numerous digits and letters involved being beyond the users ability to remember. Self dialing to distant places may require dialing of a dozen or more numbers plus letters.

A principal object of the present invention is to provide magnifying means and a note pad combined to function simultaneously in locating the name of a party and its telephone number in a telephone directory.

Another object of the invention is to provide magnifying means adapted to flatten and smooth the pages of a telephone directory about a name and its telephone number.

A further object of the invention is to provide a one piece mount that is attractive in appearance and comprising magnifying means and note pad composed of low cost material and to manufacture same by an extremely efficient method whereby the mount is adapted costwise for general distribution as an advertising medium.

Other objects and advantages of the invention will be manifest to those familiar with the art from the following description and the drawing wherein.

Figures 1, 2, 3, 4:
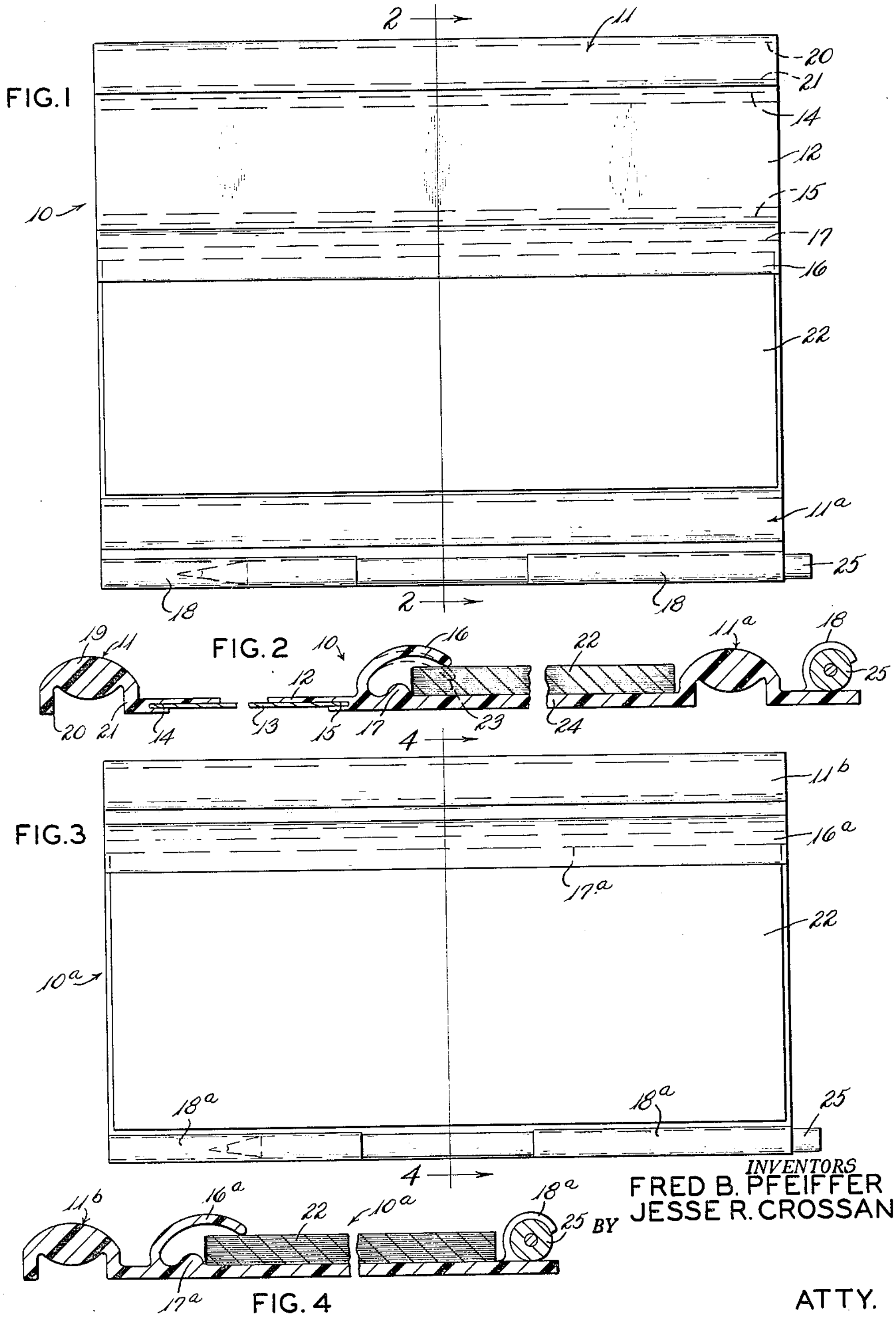
FIG. 1 is a front plan view of the mount embodying the present invention and showing a note-pad, magnifying means, an area for mounting or printing thereon advertising, and means for holding a pencil.
FIG. 2 is a sectional view taken on line 2—2 of FIG. 1.
FIG. 3 is similar to FIG. 1 and illustrates a modification of FIG. 1.
FIG. 4 is a sectional view taken on line 4—4 of FIG. 3.

Referring to the drawing in detail it will be seen the mount is referred to generically as 10 and comprises magnifying means 11 and 11*a*, a flat area 12 adapted to accommodate labeling or printing thereon/or under which a printed card 13 may be retained with the edges of the card disposed in slots 14 and 15 provided for the purpose, note-pad grip 16 with stop rib 17, and a pencil holder 18.

Mount 10 is composed of one piece of transparent thermoplastic such as, for example, but without limitation, acrylic (methyl methacrylate) and its various portions or elements are parallel and extend longitudinally of the mount body which features are important in that they make it possible to manufacture the mount by the inexpensive extrusion method as compared to the expensive molded method which otherwise would be necessary. The present invention includes the method steps of extruding the thermoplastic through proper dies into continuous strips, cooling and setting the thermoplastic in said strip form, leading the strip to a cutting station and making consecutive cuts across the strip at proper intervals to form bodies 10. The method of extruding, cooling and cutting to length just referred to is well known in the art and a detailed description of same is unnecessary for a complete disclosure of the present invention. Overall dimensions of 6″ long, 5″ wide and approximately 1/16″ thick has been found satisfactory for mount 10 when acrylic materials compose the body but obviously the size of the mount may be modified within the spirit of the invention.

By reference to FIGS. 1 and 2 it will be seen that a lens 11 comprises a magnifying portion 19 supported a predetermined distance from the plane of the bottom of the mount by legs 20 and 21. Lens 19 and legs 20–21 extend longitudinally at least the length of the mount and preferably terminate flush with the sides thereof. These are important features of the invention in that the proper positioning of the lens, relative to the printing on a sheet of paper, is established when said legs rest on the paper and when the mount is being used with a telephone directory the legs flatten and smooth the paper and the end of the lens and legs may be pressed firmly into the groove of the directory at the bound edges of the sheet forcing the groove more open whereby the lens will overlie the beginning of the printed lines. It is important to note that the legs prevent the lens from being in contact with the paper and thereby protect the lens from becoming abraded by being moved against the paper. The upper radious of lens 11 is 1/4″ and its lower radious 3/16″ and the lens is 1/16″ above the bottom of legs 20–21. Applicants have found these dimensions are critical within a very slight range relative to the convex lens 11 in obtaining satisfactory results. The magnification is very sensitive to a rolling movement of a cylindrical lens which is avoided by legs 20–21. These legs have the further function of segregating the line of print being read from the adjacent lines which has been found very helpful in reading and copying the printed words and numbers.

The note-pad grip 16 is adapted to clamp and retain a note-pad 22 of approximately 36 sheets or of 1/8″ thickness. To this end the unexpanded clearance of the gripping end 23 from the pads support 24 is 1/16″. Thus to insert the pad the holder is pried open a necessary amount to conveniently insert the pad which may have a gummed edge or be of loose sheets. A stop 17 insures accurate disposition of the pad relative to the gripping means and the gripping edge 23 provides a tearing line for removal of the sheets.

A substantial duplicate 11*a* of lens 11 is joined to the pad support portion 24 as will be seen by reference to the drawing. The purpose of lens 11*a* disposed at the bottom of the mount is to facilitate reading and copying a line of print at the bottom portion of a telephone directory. The direcory provides support for the mount when lens 11*a* overlies the lower lines of the directory. It will be seen that if lens 11 were disposed over such lower lines the mount would project below the directory and have to be manually supported while the user wrote on the pad.

Pencil holder 18 in the form of a "C" opens toward the bottom edge of the mount. Its inner surface is rounded with a radius that requires prying the "C" open somewhat to receive and removably retain a pencil to be used with the mount. For example a radius of 1/8″ would be satisfactory for most pencils presently on the market. The invention contemplates the use of a small pencil 25 and holder 18 may be so designed.

The modification of the mount 10*a* shown in FIGS. 3 and 4 comprises a lens 11*b*, pad holder 16*a*, stop 17*a*, pad 22, pencil holder 18*a* and pencil 25, which are identical wtih components 11, 16, 17, 18 and 25 respectively of FIGS. 1 and 2 and they function in the same way for the same purpose. The omission of the advertising portion and the lens 11*a* is for the purpose of economy and to provide a smaller mount.

Figure 5:
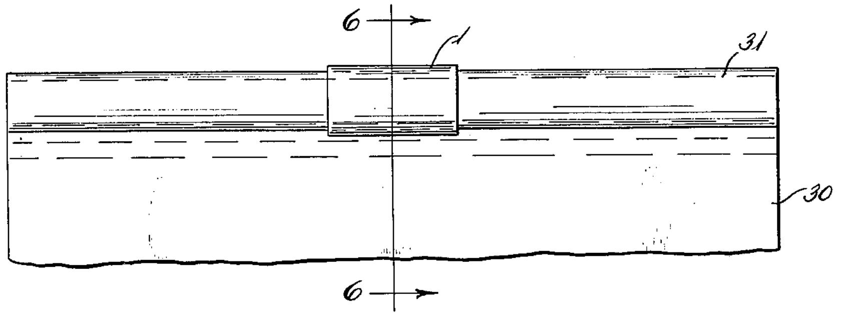
FIG. 5 is a fragmentary view similar to FIG. 1 showing a modification of the invention.
Figure 6:
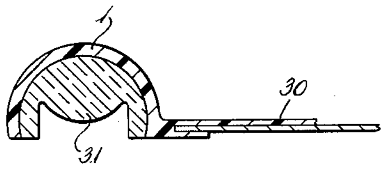
FIG. 6 is a sectional view taken on line 6—6 of FIG. 5.

Referring now to FIGS. 5 and 6 it is to be understood that the mount 30 is identical to mount 10 except a glass rod 31 has been substituted for rod 19. The body of the mount shown in FIG. 5 is extruded in the same manner as that of FIG. 1 except in place of rod 19 a "C" shape portion is formed along the edge of the mount and it is of proper size to receive and grip the glass rod 31 which is the same size and shape as rod 19. To expose the end portions of rod 31 all but 1¼" of the center of portion 1 is cut away and rod 31 inserted therein as will be seen by reference to FIG. 6.

In operation the mount is used as follows:

When the proper page in a directory has been found, by reference to the large print at the top of the pages, the mount, with pencil and pad retained thereon, is moved over the pages by the user with lens 11 parallel with the printed lines. Thus the print passes under the lens and is magnified so that the user is assisted in finding the parties listed. When the party has been found lens 11 is aligned with and over the name and the telephone number. The pad and pencil are at hand and the user copies on the pad in bold enough writing for his vision the information he needs for reference while dialing. In event of a busy-line the note is available for later reference without again referring to the directory. Also the pad is always at hand for notes desired during conversation over the phone.

It will now be seen that the mount is a composite device requiring the simultaneous use of all its integral parts to perform its useful purpose. That all the elements of the mount are interdependent in their function.

The invention has been illustrated, by way of example, and by a desirable embodiment and a modification thereof, but it is to be understood that it includes any and all modifications falling within the scope of the appended claims.

We claim:

1. A one piece note-pad mount having a top and bottom edge and being composed of transparent thermoplastic designed to assist, by magnification, the reading of the print in a telephone directory; and the copying of the printed information on note paper for reference during dialing comprising:

(a) an elongated round-rod-like lens extending along the top edge of the mount,
(b) said lens having leg portions extending downwardly a distance from the edges of the convex portions of the lens and being adapted to contact the printed sheet and to space the lower convex portion of the lens a predetermined distance from said sheet,
(c) a "C" shaped note-pad holder extending parallel to said lens and opening away therefrom,
(d) a portion of substantial width, relative to the width of the mount, disposed intermediate the lens and the note-pad holder, and being adaped for printing of advertising thereon or supportnig a printed card thereunder,
(e) a note-pad support surface adjacent the note-pad holder,
(f) a stop in the form of a rib within the note-pad holder adapted to position a note-pad,
(g) a second lens substantially the same as the first mentioned lens adjacent the lower edge of the pad surface, and
(h) a pencil holder of "C" shape extending along the lower edge of the mount.

2. A one piece note-pad mount having a top and bottom edge and being composed of transparent thermoplastic designed to assist, by magnification, the reading of the print in a telephone directory; and the copying of the printed information on note paper for reference during dialing comprising:

(a) an elongated round-rod-like lens extending along the top edge of the mount,
(b) said lens having leg portions extending downwardly a distance from the edges of the convex portions of the lens and being adapted to contact the printed sheet and to space the lower convex portion of the lens a predetermined distance from said sheet,
(c) a "C" shaped note-pad holder extending parallel to said lens and opening away therefrom,
(d) a portion of substantial width, relative to the width of the mount, disposed intermediate the lens and the note-pad holder, and being adapted for printing of advertising thereon or supporting a printed card thereunder,
(e) a note-pad support surface adjacent the note-pad holder, and
(f) a stop in the form of a rib within the note-pad holder adapted to position a note-pad.

3. A note-pad mount designed to assist, by magnification, the reading of print in a telephone directory, and the copying of the printed information on note paper for reference during dialing comprising:

(a) said mount being composed of one piece of transparent thermoplastic having a top and bottom edge,
(b) an elongated round-rod-like lens extending along the top edge of the mount,
(c) said lens having leg portions extending downwardly a distance from the edges of the convex portions of the lens and being adapted to contact the printed sheet and to space the lower convex portion of the lens a predetermined distance from said sheet.
(d) a "C" shaped note-pad holder extending parallel to said lens and opening away therefrom,
(e) a portion of substantial width, relative to the width of the mount, disposed intermediate the lens and the note-pad holder, and being adapted for printing of advertising thereon or supporting a printed card thereunder,
(f) a note-pad support surface adjacent the note-pad holder, and
(g) a stop in the form of a rib within the note-pad holder adapted to position a note-pad.

References Cited by the Examiner

UNITED STATES PATENTS

| | | | |
|---|---|---|---|
| 2,242,296 | 5/41 | Fraser. | |
| 2,453,272 | 11/48 | Savoie. | |
| 2,545,014 | 3/51 | Anderson | 88—1 X |
| 2,563,709 | 8/51 | Ehrler | 281—15 |
| 2,826,959 | 3/58 | Schneider | 88—39 |
| 3,052,158 | 9/62 | Sonni | 88—39 |

FOREIGN PATENTS

| | | |
|---|---|---|
| 852,698 | 10/60 | Great Britain. |

DAVID H. RUBIN, *Primary Examiner.*